(12) United States Patent
Coupard et al.

(10) Patent No.: US 12,276,567 B2
(45) Date of Patent: Apr. 15, 2025

(54) METHOD AND SYSTEM FOR MONITORING A STATUS OF A REDUCER OF A GAS TURBINE

(71) Applicant: SAFRAN AIRCRAFT ENGINES, Paris (FR)

(72) Inventors: Josselin Xavier Coupard, Moissy-Cramayel (FR); Alméric Pierre Louis Garnier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 578 days.

(21) Appl. No.: 17/437,978

(22) PCT Filed: Feb. 27, 2020

(86) PCT No.: PCT/FR2020/050381
§ 371 (c)(1),
(2) Date: Sep. 10, 2021

(87) PCT Pub. No.: WO2020/183088
PCT Pub. Date: Sep. 17, 2020

(65) Prior Publication Data
US 2022/0170819 A1 Jun. 2, 2022

(30) Foreign Application Priority Data
Mar. 13, 2019 (FR) .................................... 19 02573

(51) Int. Cl.
*G01M 13/021* (2019.01)
*G01M 15/14* (2006.01)

(52) U.S. Cl.
CPC .......... *G01M 13/021* (2013.01); *G01M 15/14* (2013.01)

(58) Field of Classification Search
CPC ............................ G01M 13/021; G01M 15/14
See application file for complete search history.

(56) References Cited

U.S. PATENT DOCUMENTS

| 10,634,233 B1* | 4/2020 | Smith ................ F16H 57/0417 |
| 2017/0145852 A1 | 5/2017 | McCune et al. |

(Continued)

FOREIGN PATENT DOCUMENTS

| EP | 3 109 416 A1 | 12/2016 |
| FR | 3 050 761 A1 | 11/2017 |

OTHER PUBLICATIONS

International Search Report issued on Jul. 3, 2020 in PCT/FR2020/050381 filed Feb. 27, 2020, 3 pages.

(Continued)

*Primary Examiner* — Matthew G Marini
*Assistant Examiner* — Leo T Hinze
(74) *Attorney, Agent, or Firm* — Oblon, McClelland, Maier & Neustadt, L.L.P.

(57) ABSTRACT

A method for monitoring a status of a reduction gear of a gas turbine includes the steps of: obtaining measurements of parameters accomplished during an operating phase of the gas turbine, these parameters including temperatures of a lubricating oil of the reduction gear at the inlet and at the outlet of the reduction gear, a parameter representing a speed of the gas turbine, as well as at least one context parameter; selecting measurements; normalizing temperatures of the lubricating oil using the measurements of the context parameter; evaluating a thermal efficiency of the reduction gear by using a physical model defining the thermal efficiency based on a difference between the temperature of the lubricating oil; and determining a status of the reduction gear depending on a step of comparing the evaluated thermal efficiency with respect to a reference signature.

7 Claims, 5 Drawing Sheets

(56) References Cited

U.S. PATENT DOCUMENTS

2017/0314473 A1 11/2017 Morreale
2020/0025069 A1* 1/2020 Kupratis ................. F02C 3/107

OTHER PUBLICATIONS

Preliminary French Search Report issued on Nov. 12, 2019 in French Application No. 1902573 filed Mar. 13, 2019, 3 pages (with English Translation of Categories of Cited Documents and Written Opinion).
Handschuh, R., et al., "Operational Influence on Thermal Behavior of High-Speed Helical Gear Trains", NASA/TM-2006-214344, 2006, XP055194372, pp. 1-11, 16 total pages.

* cited by examiner

METHOD AND SYSTEM FOR MONITORING A STATUS OF A REDUCER OF A GAS TURBINE

PRIOR ART

The invention relates to the monitoring of the status of a speed reduction system (also called a reduction gear) of a gas turbine, such as for example a gearbox of a turbojet or more generally of a turbomachine.

It has a favored application in the field of aeronautics, but can also be used for the monitoring of reduction gears integrated into systems other than aeronautical system, such as wind turbines, etc.

In known fashion, a gas turbine equipping an aircraft, such as a turbojet for example, is generally equipped with a reduction gear which allows coupling different elements of the gas turbine to an element driven in rotation, such as for example to the compressor shaft of the gas turbine. This reduction gear allows the transmission of power between the different elements coupled through it, and more particularly the proportional adjustment of the angular speeds of the elements thus coupled. A reduction gear of this type is for example a gearbox located between the low-pressure compressor shaft of a turbojet and its fan.

A reduction gear is therefore an important part of the transmission system of the gas turbine, which is heavily loaded and likely to be subject, during the operation of the gas turbine (in other words the flights of the aircraft equipped with the latter) to degradations due in particular to wear and to aging. A degradation of this type can cause a malfunction of the transmission system of the gas turbine and have serious consequences. Consequently, it is appropriate to attentively monitor the status of the reduction gear equipping a gas turbine in order to be able to intervene opportunely on the latter when the status of this reduction gear is degraded, for example by carrying out maintenance or replacing it.

It is known to proceed with the monitoring of a gas turbine reduction gear by relying on a vibration analysis accomplished by means of a vibration sensor such as an accelerometer. This vibration analysis consists of comparing the amplitude of the vibration signal acquired by the vibration sensor at the meshing frequency with the amplitude of the vibration signal contained in the lateral bands, and to deduce, depending on the ratio of these amplitudes whether the reduction gear is in an operational or a faulty status.

A technique of this type relies on the fact that during normal operation of the reduction gear, the amplitude of the vibration signal at the meshing frequency is normally greater than the amplitude of the vibration signal in the lateral bands. The status of the reduction gear can therefore be deduced by comparing the amplitude ratio to different predetermined thresholds. For example, an amplitude ratio of 5 measured during a takeoff phase of the aircraft indicates a quasi-new status of the reduction gear, while a ratio of less than 2 measured during the same takeoff phase is likely to indicate that maintenance should be contemplated.

The setting of the thresholds to which the amplitude ratio should be compared can prove complicated. In addition, this technique relies on the detection of a vibration signal in the lateral bands, the presence of which assumes the existence of an already verified fault well established on the reduction gear. In other words, monitoring operated via a technique of this kind leads to a Boolean ruling on damage to the reduction gear (the reduction gear is faulty or not).

There exists therefore a need for a monitoring method allowing the status of a reduction gear to be monitored more precisely and more accurately in order to be able to be able to speed as soon as possible a maintenance or replacement operation on the reduction gear if necessary.

DISCLOSURE OF THE INVENTION

The present invention responds in particular to this need by proposing a method for monitoring a status of a reduction gear (for example a power reduction gear) of a gas turbine comprising, for at least one duty cycle of the reduction gear:
  a step of obtaining at least one set of measurements of a plurality of parameters accomplished over at least one time interval of a determined duration during at least one operating phase of the gas turbine, said parameters comprising operating parameters of the reduction gear including temperatures of a lubricating oil of the reduction gear at the inlet and at the outlet of the reduction gear, and of the gas turbine including at least one parameter representing a speed of the gas turbine (such as for example the rotation speed of the low-pressure shaft of the gas turbine), as well as at least one context parameter;
  a step of selecting, among said at least one set of measurements obtained for said at least one operating phase, of a set containing measurements that are stable with regard to a predetermined stability criterion;
  a step of normalizing measurements of temperatures of the lubricating oil at the inlet and at the outlet of the reduction gear of the set of selected measurements by using measurements of the context parameters of the set of selected measurements; and
  a step of evaluating, based on the set of selected measurements, a thermal efficiency of the reduction gear by using a physical model defining the thermal efficiency based on a difference between the temperature of the lubricating oil at the outlet of the reduction gear and the temperature of the lubricating oil at the inlet of the reduction gear;
said monitoring method also comprising:
  a step of comparing the thermal efficiency evaluated for said at least one duty cycle with respect to at least one reference signature representing an operational behavior or a faulty behavior of the reduction gear; and
  a step of determining a status of the reduction gear depending on the result of the comparison step.

A phase of operation of the gas turbine designates a time period of a duty cycle of the turbine. For example, when the gas turbine in question equips an aircraft, an operating phase of this type can correspond to a flight phase of the aircraft such as a takeoff, cruise, ground idle, taxi, descent, or even shutdown phase.

In conformity with the invention, one or more sets of measurements are collected during each operating phase of the gas turbine in question, over one or more time intervals having determined durations (particularly several sets of measurements can be collected over several time intervals for a long operating phase). This duration can depend on the considered operating phase of the aircraft, and be predetermined, such as for example 5 minutes for a ground idle phase or a cruise phase. But it can also be determined dynamically, for example depending on stopping the rotation of the reduction gear.

Moreover, the invention offers the possibility of taking into account several duty cycles of the reduction gear during the estimation of its status. What is meant here by duty cycle is a duty cycle of the gas turbine using this reduction gear. By way of illustration, a duty cycle of this type corresponds, for a gas turbine equipping an aircraft, to a flight of the aircraft.

Correlatively, the invention also applies to a system for monitoring a status of a reduction gear of a gas turbine, comprising modules, activated for at least one duty cycle of the reduction gear, said modules comprising:

an acquisition module, configured to obtain at least one set of measurements of a plurality of parameters accomplished over at least one time interval of a determined duration during at least one operating phase of the gas turbine, said parameters comprising operating parameters of the reduction gear including temperatures of a lubricating oil of the reduction gear at the inlet and at the outlet of the reduction gear, and of the gas turbine including at least one parameter representing a speed of the gas turbine, as well as at least one context parameter;

a selection module, configured to select, among said at least one set of measurements obtained for said at least one operating phase, a set containing measurements that are stable with regard to a predetermined stability criterion;

a normalization module configured to normalize the measurements of the temperatures of the lubricating oil at the inlet and at the outlet of the reduction gear of the set of selected measurements by using the measurements of the context parameters of the set of selected measurements;

an evaluation module, configured to evaluate, based on the set of selected measurements, a thermal efficiency of the reduction gear by using a physical model defining the thermal efficiency based on a difference between the temperature of the lubricating oil at the outlet and the temperature of the lubricating oil at the inlet of said reduction gear;

said system also comprising:

a comparison module configured to compare the thermal efficiency evaluated for said at least one duty cycle of the reduction gear with respect to at least one reference signature representing an operational behavior or of a faulty behavior of the reduction gear; and a determination module configured to determine a status of the reduction gear depending on the result obtained by the comparison module.

The invention thus proposes monitoring of the status of a reduction gear of a gas turbine based on the analysis of the evolution of its thermal efficiency during one or more duty cycles of the reduction gear. This thermal efficiency characterizes in known fashion the quantity of energy dissipated or lost in the form of heat during the operation of the reduction gear, due in particular to the friction encountered in the different elements of the reduction gear during the rotation of the shaft on which it is placed.

It is characterized, in conformity with the invention, based on the thermal dissipation noted in the lubrication oil of the reduction gear, which is reflected in the difference between the temperature of the oil at the outlet of the reduction gear and the temperature of the oil at the inlet of the reduction gear, and in a physical model linking this thermal dissipation with certain operating parameters of the gas turbine, such as for example its speed (which can be characterized in particular by the rotation speed of the shaft of the compressor of the gas turbine).

The thermal efficiency advantageously takes into account the capacity of the reduction gear to accomplish its function within the gas turbine, and is therefore particularly relevant for evaluating the performance and determining the status of the reduction gear. A modification of the efficiency of the reduction gear and in particular a deviation this efficiency relative to what is expected can in fact cause a malfunction of the transmission system of the gas turbine.

The comparison of the thermal efficiency with the reference signatures in conformity with the invention offers the possibility of identifying different status of the reduction gear:

if the thermal efficiency is comprised in an acceptable range at the reduction gear, the reduction gear can be considered to be in an operational status;

if on the other hand the efficiency is less than that of a normal operation of the reduction gear but beyond an acceptability threshold, a "to be monitored" status can be assigned to the reduction gear;

if the efficiency is less than the acceptability threshold, that means that the reduction drive is faulty and maintenance or a replacement must be contemplated.

This comparison can advantageously be repeated for different time intervals considered over different operating ranges of the gas turbine, and during different duty cycles of the gas turbine and in turn of the reduction gear. The invention, via the monitoring of the evolution over time of the thermal efficiency of the reduction gear, thus allows rapidly detecting a deviation of the thermal efficiency linked for example to its aging, including when it occurs slowly. It allows contemplating as early as possible an appropriate response to this deviation, such as for example a maintenance operation. It is noted that the observation of the thermal efficiency over several operating phases of the gas turbine advantageously allows detecting problems affecting the enclosure in which the reduction gear is located, such as sealing problems for example.

The invention also offers the possibility of accomplishing trend monitoring on the thermal efficiency of the reduction gear and on its status. This allows accomplishing predictions and/or prognoses regarding the future status of the reduction gear and being able to plan maintenance operations in advance on the gas turbine.

It is noted that the invention has a preferred, though not limiting, application in the context of engines able to delivery very high power (greater than 10 MW) such as for example UHBR (Ultra-High Bypass Ratio) engines which have a very high bypass ratio.

The thermal efficiency of the reduction gear depends heavily on the conditions in which the gas turbine is operating (for example climatic conditions, when the gas turbine equips an aircraft), which can prove to be unstable. The invention advantageously allows controlling this dependence with respect to the context and to the environment in which the reduction gear operates and to offer, through the monitoring of the thermal efficiency of the reduction gear, a reliable means of knowing its status due to the steps of selecting and normalizing implemented during the monitoring method. These steps allow eliminating the effects linked to the context in which the reduction gear is located and to be able to compare, via the analysis of its thermal efficiency, the status of the reduction gear over several duty cycles.

More particularly, the selection step allows selecting measurements corresponding to functional stability conditions (speed stability of the gas turbine, but also of the oil temperatures at the inlet/outlet of the reduction gear used to evaluate the thermal efficiency).

To this end, for example, the step of selecting the set of measurements can comprise, in a particular embodiment, a step of evaluating, for several sets of measurements corresponding to a time interval with said determined duration:
of a first score called stability, equal to a weighted sum evaluated over the operating parameters, of the proportion of the measurements of each operating parameter of the set in question located in a predefined range of values for this operating parameter;
of a second stability score, equal to a weighted sum evaluated over the parameters of operation, of the proportion of the measurements of each operating parameter in the set in question having a determined theoretical dispersion for this operating parameter;
said set of measurements selected during the selection step corresponding to the set of measurements maximizing a weighted sum of the first stability score and of the second stability score.

The weightings applied in calculating the scores and during the selection of the set of measurements can be determined experimentally or by experts, taking into account the sensitivity of the thermal efficiency with respect to each operating parameter considered (i.e. the influence of each parameter on the thermal efficiency).

In other words, to evaluate the thermal efficiency over a duty cycle of the reduction gear, a selection is made of an interval of time over which the number of measurements which satisfy a stability criterion and a dispersion criterion is maximum. The dispersion criterion is advantageously evaluated based on a theoretical model of the expected values for the operating parameters: this allows mitigating a failure of the operating parameter sensors. Of course, other criteria can be contemplated for selecting the measurements to be considered during the evaluation of the thermal efficiency, but criteria that allow for example ensuring that the speed of the gas turbine is stabilized, that if applicable the attitude of the aircraft carrying the gas turbine on board is horizontal (correct assumption in particular during taxi, cruise and takeoff phases), that the lubricating oil level in the oil circuit is sufficient, that the pressure of the lubricating oil is constant, etc. will be favored.

Besides the selection of "stabilized" measurements, the normalization step allows making comparable the thermal efficiencies corresponding to different operating conditions of the gas turbine and of the reduction gear. It allows dispensing with the influence of context parameters, such as for example the ambient temperature and/or atmospheric pressure which can have a great influence on the thermal efficiency of the reduction gear.

It is noted that the invention is not limited to collecting the aforementioned operating parameters (speed and oil temperatures at the inlet/outlet of the reduction gear). Other parameters such as for example the oil pressure, the oil level or even, when the gas turbine is equipping an aircraft, the attitude of the aircraft can be contemplated and used in particular for selecting the set of measurements on which the thermal efficiency will be evaluated, allowing the monitoring of the status of the reduction gear.

To determine more accurately the status of the reduction gear, other indicators can be contemplated in combination with the thermal efficiency of the reduction gear.

Thus, in one particular embodiment, the monitoring method also comprises a step of evaluating at least one health indicator of the reduction gear among at least:
a heating margin indicator of the temperature of the lubricating oil between the inlet and the outlet of the reduction gear;
a margin indicator of the temperature of the lubricating oil at the outlet of the reduction gear;
an operating temperature margin indicator of the reduction gear under worst case conditions;
a pressure margin indicator of the lubricating oil during a predetermined operating phase of the gas turbine; and
a thermal efficiency margin indicator of the reduction gear;
and in which the step of determining the status of the reduction gear also takes into account said at least one evaluated health indicator.

In conformity with the invention, the thermal efficiency of the reduction gear is evaluated based on a physical model taking into account the thermal dissipation noted in the lubricating oil of the reduction gear. Faults in the reduction gear and in particular its rotating parts (for example the gearing of the reduction gear) have the effect of modifying the heat exchanges noted in the lubrication oil circuit. The aforementioned indicators which characterized the heating or temperature margins of the lubricating oil therefore supply complementary information regarding the thermal efficiency of the reduction gear which allow analyzing more accurately the state of health of the reduction gear.

For example, the heating margin indicator of the temperature of the lubricating oil between the inlet and the outlet of the reduction gear manifests the capacity of the reduction gear to be lubricated by the oil that is supplied to it. Taking this indicator into account in addition to the thermal efficiency offers better visibility for carrying out a rapid initiation of a maintenance operation on the reduction gear.

The temperature margin indicator of the lubricating oil at the outlet of the reduction gear allows taking into account the entire lubricating oil circuit. The pressure margin indicator of the lubricating oil during a predetermined operating phase of the gas turbine, and particularly when the gas turbine equips an aircraft during a takeoff phase of the aircraft (during which the thermal dissipation is greatest), allows determining very simply whether the lubricating performance of the oil is sufficient.

In another embodiment, the monitoring method also comprises a step of evaluating at least one trending indicator characterizing one use of the reduction gear among at least:
an indicator representing the number of duty cycles of the reduction gear and/or the number of duty cycles of the reduction gear since a maintenance operation carried out on the reduction gear;
an indicator representing an operating time of the reduction gear and/or an operating time of the reduction gear since a maintenance operation carried out on the reduction gear;
an indicator representing a number of duty cycles of the reduction gear since a maintenance operation carried out on the gas turbine;
an indicator representing an operating time of the reduction gear at high temperature;
an indicator representing an operating time of the reduction gear with a high particle level in the lubricating oil of the reduction gear;
and in which the step of determining the status of the reduction gear also takes into account said at least one evaluated trending indicator.

These indicators reflect the operation of the reduction gear and allow estimating a fatigue status of the reduction gear, taking its operation into account. For example, the weighted sum of these indicators can be used to derive a probability of malfunction of the reduction gear which, combined with the analysis of the thermal efficiency, allows refining the estimate of the status of the reduction gear.

In one particular embodiment, the method also comprises:

a step of detecting whether the measurements obtained of the temperature a the inlet and of the temperature at the outlet of the reduction gear comprise outliers; and a step of eliminating said outliers;

in which:

an outlier is detected for a said temperature when it is inconsistent with a theoretical value determined for this temperature depending on the speed of the gas turbine; and/or an outlier is detected for the temperature at the inlet of the reduction gear when this value has a deviation greater than a predetermined threshold with respect to a measurement of the ambient temperature; and/or an outlier is detected for the temperature at the outlet of the reduction gear when this value has a deviation greater than a predetermined threshold with respect to a reference temperature; and/or an outlier is detected for the temperature at the outlet of the reduction gear when this value is less than the value of the temperature at the inlet of the reduction gear.

This allows retaining only relevant values for the evaluation of the thermal efficiency, and to improve its estimate.

In addition, this allows limiting the quantity of measurements which must be stored (for example on board the aircraft in the case of a gas turbine equipping an aircraft) or transmitted to the acquisition module of the monitoring system for the evaluation of the thermal efficiency.

Different architectures of the monitoring system according to the invention can be contemplated: the different modules of the monitoring system can be located in the same place or distributed over several entities.

Thus, in a particular embodiment, the monitoring system according to the invention also comprises a plurality of sensors on board the gas turbine and configured to acquire said operating and context measurements over a plurality of time intervals having said determined duration.

By way of illustration, in the context of a gas turbine equipping an aircraft, the monitoring system can consist of a portion carried on board the aircraft, comprising in particular the aforementioned sensors, and another portion located in a ground-based entity, the aircraft and said entity being able to communicate via a satellite link or an ARINC interface.

In one particular embodiment in which said gas turbine equips an aircraft, the monitoring method also comprises:

a module for filtering the measurements acquired by said plurality of sensors, configured to eliminate from said measurements those having outliers with respect to at least one predetermined criterion;

a selection module configured to select among the filtered measurements those corresponding to at least one predetermined operating phase of the aircraft; and a transmission module configured to transmit the selected measurements to the acquisition module.

In one particular embodiment of the invention, the monitoring system also comprises a compression module, configured to compress the selected measurements, the transmission module being configured to transmit the selected measurements to the acquisition module in a compressed form.

These embodiments allow reducing the quantity of measurements to be transmitted to the acquisition module for the evaluation of the thermal efficiency of the reduction gear.

In one particular embodiment of the invention, the different steps of the monitoring method are determined by instructions of computer programs.

Consequently, the invention also applies to a computer program in a storage medium, this program being able to be implemented in a monitoring system or more generally in a computer, this program including instructions adapted to the implementation of the steps of a monitoring method as described above.

This program can use any programming language, and be in the form of source code, object code or an intermediate code between the source code and the object code, such as in a partially compiled form, or in any other desirable form.

The invention also applies to a storage medium readable by a computer, and including instructions from a computer program as mentioned above.

The storage medium can be any entity of device capable of storing the program. For example, the medium can include a storage means, such as a ROM, for example a CD ROM or a microelectronic circuit ROM, or even a magnetic recording means, for example a hard disk.

On the other hand, the storage medium can be a transmissible medium such as an electrical or optical signal, which can be routed via an electrical or optical cable, by radio or by other means. The program according to the invention can in particular be uploaded to a network of the Internet type.

Alternatively, the storage medium can be an integrated circuit in which the program is incorporated, the circuit being adapted to execute or to be used in the execution of the method in question.

BRIEF DESCRIPTION OF THE DRAWINGS

Other features and advantages of the present invention will be revealed by the description given below, with reference to the appended drawings which illustrate an exemplary embodiment of it lacking any limitation. In the figures.

DESCRIPTION OF THE EMBODIMENTS

Figure 1:
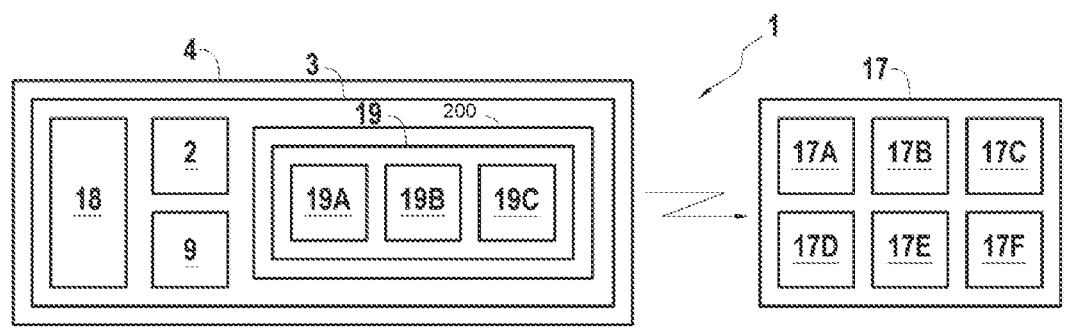
FIG. 1 shows in its environment a monitoring system conforming to the invention in a particular embodiment.

FIG. 1 shows, in its environment, a system 1 for monitoring a status of a reduction gear 2 of a gas turbine 3, conforming to the invention, in one particular embodiment.

In the example considered in FIG. 1, the gas turbine 3 is, for the purposes of illustration, a high-power turbojet equipping an airplane 4, such as for example a UHRB turbojet, and the reduction gear 2 is a gearbox or gear train. The invention can, however, be used in other contexts for other high-power (for example greater than 1 MW) gas turbines, as well as in other fields than aeronautics, such as for example for a gas turbine equipping a wind turbine, etc.

Figure 2:
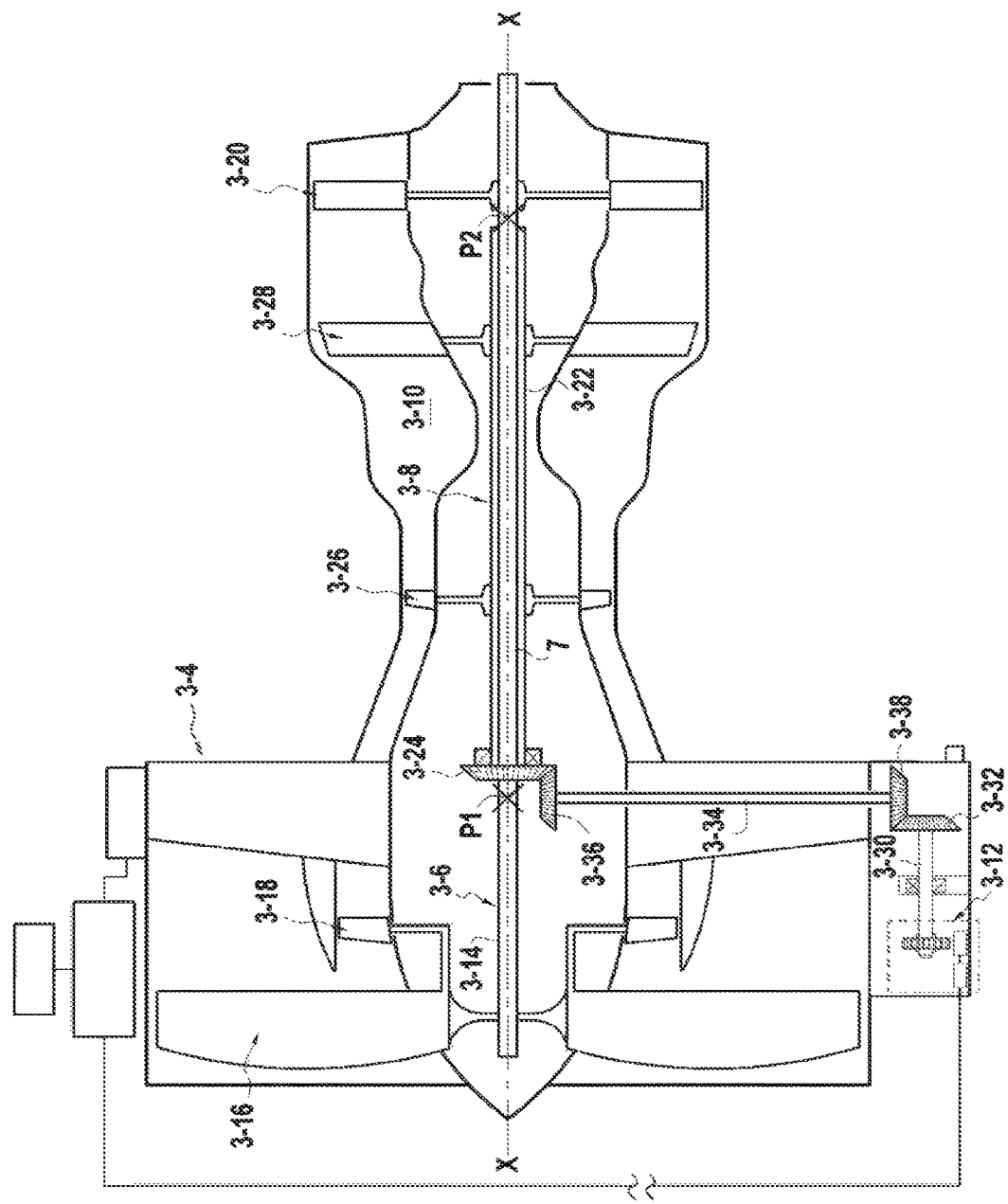
FIG. 2 shows a section of a turbojet comprising a reduction gear, on which monitoring is accomplished in conformity with the invention.

FIG. 2 illustrates a schematic section of the two-spool double-flow UHRB turbojet 3 equipped with the reduction gear 2. The structure of a turbojet of this type is known per se and is only briefly recalled here.

The turbojet 3 with longitudinal axis X-X consists, in known fashion, of a fan casing 3-4, a low-pressure spool 3-6, a high-pressure spool 3-8, a combustion chamber 3-10 and an accessory gearbox (or AGB) 3-12.

The low-pressure spool 3-6 includes a low-pressure shaft 3-14, centered on the longitudinal axis X-X, a fan 3-16 mounted on the front end of the low-pressure shaft, a low-pressure compressor 3-18 attached to the fan downstream of it, and a low-pressure turbine 3-20 mounted on the rear end of the low-pressure shaft.

The high-pressure spool 3-8 includes a high-pressure shaft 3-22 positioned concentrically around the low-pressure shaft 3-14, a bevel gear 3-24 mounted at the front end of the high-pressure shaft, a high-pressure compressor 3-26 mounted on the high-pressure shaft downstream of the gear 3-24 and a high-pressure turbine 3-28 mounted on the rear end of the high-pressure shaft.

For reasons of clarity, the different compressors and turbines of the low-pressure and high-pressure spools of the turbojet 3 have been shown in FIG. 2 with a single stage of blades. Of course, in a manner well known per se, these elements can carry several stages of blades.

The accessory drive gearbox 3-12 is attached, for example, to a lower face 3-4*a* of the fan shroud 3-4. Here this gearbox 3-12 includes a so-called "accessory" shaft 3-30 bearing at its rear end a bevel gear 3-32. The shaft 3-30 of the accessory drive gearbox is driven in rotation by the high-pressure shaft 3-22 via a countershaft 3-34 bearing a bevel gear 3-36 at its upper end and a bevel gear 3-38 at its lower end. In the example considered here, the reduction gear 2 is a gear train positioned between the fan 3-16 and the low-pressure turbine 3-20, for example at positions P1 (just in front of the bevel gear 3-36) or P2 (just upstream of the low-pressure turbine 3-20) indicated in FIG. 2.

Figure 3:
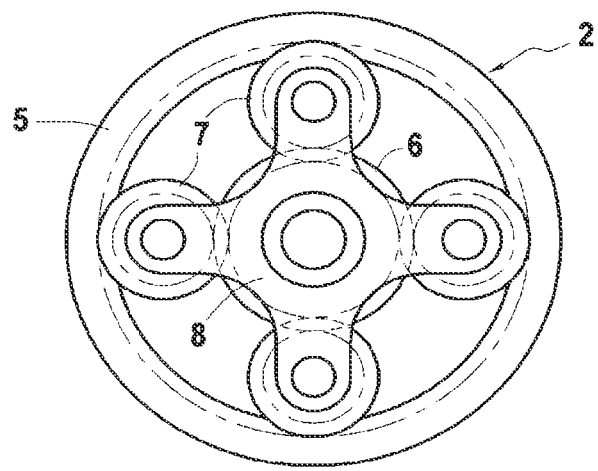
FIG. 3 shows an example of a reduction gear included in the turbojet of FIG. 2, on which monitoring is accomplished in conformity with the invention.

FIG. 3 shows the reduction gear 2 schematically. In the embodiment described here, the reduction gear 2 is for example an epicyclic gear train allowing several rotating elements (several shafts or rotors) of the gas turbine 3 having different speeds of rotation to be coupled together. The reduction gear 2 is a power transmission system reducing (or increasing) the rotation speed between the elements driven in rotation through it. To this end, it comprises in known fashion two gears (or toothed wheels) 5 and 6, called sun and ring respectively, against which turn a plurality of gears (or toothed wheels) called planet gears 7. The planet gears 7 are held by a movable frame 8.

Of course, this example is given only by way of illustration and the invention applies to other types of reduction gears able to be used in a gas turbine.

Figure 4:
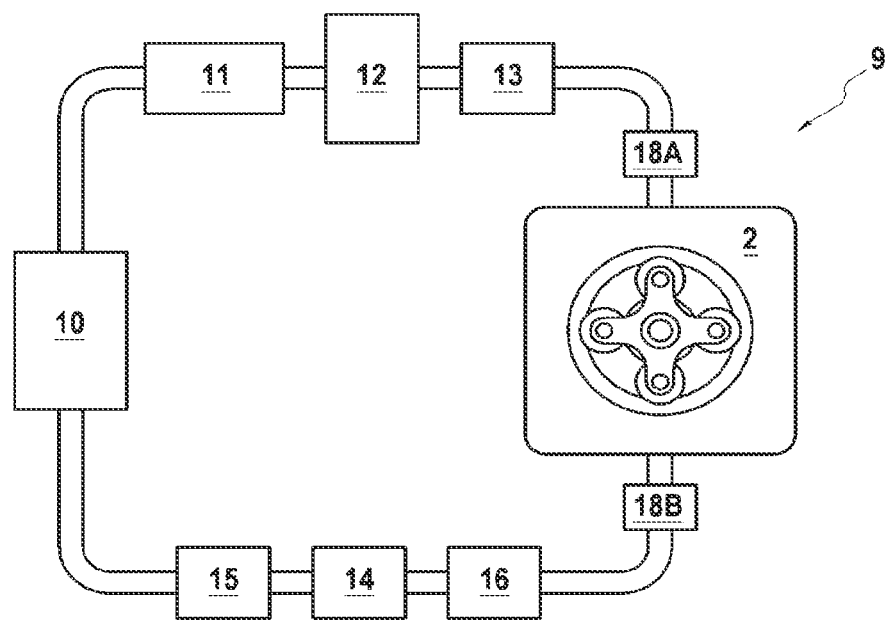
FIG. 4 shows the lubricating oil circuit of the reduction gear of FIG. 3, in a particular embodiment.

In the example considered here, the reduction gear 2 is lubricated by means of an oil circuit 9 shown schematically in FIG. 4. The oil circuit 9 comprises in known fashion an oil reservoir 10, a primary pump 11, a filter 12, a heat exchanger 13, a particle detector 14 (equipped with magnets allowing particles to be captured) and a scavenging pump 15. It can also comprise an accessory case 16, connected to the reduction gear 2 and allowing driving in rotation different types of equipment such as in particular electric generators, mechanical pumps, fuel pumps, lubrication pumps, etc.

It is noted that other schematics of the oil circuit allowing lubricating the reduction gear 2 can be contemplated as variants.

By way of illustration, it is considered that a reduction gear such as the reduction gear 2, when it equips a high-power turbojet such as the UHBR turbojet 3, sees approximately 40% of the power of the turbojet pass through it and must dissipate up to 30 MW per hour during one operating phase of the airplane equipped with the turbojet such as the takeoff phase. This dissipation in the form of heat is due to several phenomena, and particularly to heat conduction phenomena between the metallic parts composing the reduction gear 2, convection phenomena linked to the circulation of lubricating oil of the reduction gear 2, and radiation phenomena inherent in the reduction gear 2.

Considering this heavy load on the reduction gear 2, and its major function in the transmission system of the turbojet 3, the inventors had the idea of monitoring the status of the reduction gear 2 by analyzing the evolution of its thermal efficiency over time. To this end, the thermal efficiency of the reduction gear 2 is estimated, in conformity with the invention, based on a physical model and a measurement of thermal dissipation by the lubricating oil of the reduction gear 2, assuming conditions in which the thermal dissipation by thermal conduction and by radiation can be considered to be repeatable (reproducible).

A modification of the thermal efficiency of the reduction gear 2 being able to cause a malfunction of the power transmission system of the turbojet 3, the thermal efficiency of the reduction gear 2 appears to be a particularly relevant and determining factor for monitoring the status of this reduction gear 2.

The monitoring of the status of the reduction gear 2 is accomplished as previously mentioned by the monitoring system 1. With reference to FIG. 1, in the embodiment described here, the monitoring system 1 comprises to this end a portion carried on board the airplane equipped with the turbojet 3, and a portion integrated into a ground-based entity 17. An entity of this type is for example a server or more generally a computer managed for example by the owner of the airplane.

The portion carried on board the airplane comprises a plurality of sensors 18, known per se, carried in the turbojet 3 and configured to acquire measurements of various parameters (operating parameters and context parameters) during flights of the airplane. These parameters are further detailed hereafter: they comprise in particular the ambient atmospheric temperature and pressure, the rotation speeds of the turbojet, the temperatures of the lubricating oil of the reduction gear 2 at the inlet and at the outlet of the reduction gear 2, etc. The sensors 18 therefore comprise temperature, pressure, speed, etc. sensors. They can integrate sensors already provided on board the airplane (for example the oil pressure and atmospheric pressure sensor, the rotation speed sensor of the low-pressure and high-pressure compressors, the ambient temperature sensor placed at the turbojet 3 fan, etc.) as well as the sensors belonging to the invention.

Thus, as illustrated in FIG. 4, the sensors 18 comprise in particular a temperature sensor 18A placed at the inlet of the reduction gear 2, able to measure the temperature of the lubricating oil at the inlet of the reduction gear 2, and a temperature sensor 18B placed at the outlet of the reduction gear 2, able to measure the temperature of the lubricating oil at the outlet of the reduction gear 2. To this end, the sensor 18A can be placed on the supply line of the oil circuit 9, at the outlet of the heat exchanger 13. For its part, the sensor 18B can be placed on the enclosure (casing) accommodating the reduction gear 2, as close as possible to it, for example on a lubricating oil scavenging sheet provided on this enclosure. It is noted that the temperature measurements accomplished by the sensors 18A and 18B can be accomplished directly on the lubricating oil or on pipes transporting this lubricating oil in the oil circuit 9.

The portion of the monitoring system I carried on board the airplane also comprises different modules 19 for processing data acquired by the sensors 18. These modules are, in the embodiment described here, integrated into the computer 200 of the turbojet 3 (also known by the name of FADEC, for Full Authority Digital Engine Control). Here these are software modules 19A-19C which perform different processes on the measurements acquired by the sensors 18 and in particular: filtering of the measurements intended to eliminate measurements having outliers (filtering module 19A), a selection of the measurements corresponding to operating phases of the airplane 4 and a fortiori of the turbojet 3 of interest during the monitoring of the reduction gear 2 (selection module 19B), and transmission of the filtered selected measurements to the ground-based entity 17 (transmission module 19C).

In the embodiment described here, the transmission module 19C comprises a compression module (not shown in the figures) configured to compress the filtered selected measurements before transmitting them to the ground-based entity 17. The transmission module 19C also relies, for transmitting the measurements acquired by the sensors 18 to the ground-based entity 17 in order to allow it to evaluate the thermal efficiency of the reduction gear 2, on a wireless communication interface allowing it to communicate with this ground-based entity 17, such as for example a satellite communication interface.

Figure 5:
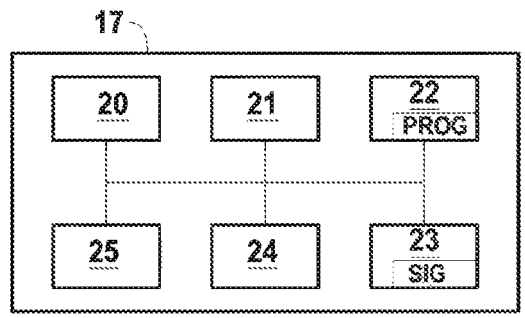
FIG. 5 shows the material architecture of a ground-based entity of the monitoring system of FIG. 1, participating in the monitoring of the reduction gear of FIG. 3.

As previously mentioned, the ground-based entity 17 is a computer, the material architecture of which is shown schematically in FIG. 5.

It comprises a processor 20, a random access memory 21, a read-only memory 22, a non-volatile flash memory 23, communication means 24 comprising a satellite communication interface allowing it to communicate in particular with the computer 200 carried on board the airplane 4, and input/output means 25, such as a keyboard, a screen, etc.

In the embodiment described here, the read-only memory 22 of the ground-based entity 17 constitutes a recording medium conforming to the invention, readable by the processor 20, on which is recorded a computer program PROG conforming to the invention, including instructions for the execution of a portion of the steps of the monitoring method according to the invention. This computer program PROG defines the functional and software modules of the ground-based entity 17 which use or rely on the material elements 20-25 of the ground-based entity 17 previously mentioned. These modules comprise in particular, as illustrated in FIG. 1:

an acquisition module 17A configured to obtain measurements, accomplished by means of the sensors 18, of a plurality of parameters including operating parameters of the reduction gear 2 (comprising in particular the temperature of the lubricating oil of the reduction gear 2 at the inlet and at the outlet of the reduction gear 2) and of the turbojet 3 (comprising here in particular the speed of the turbojet 3 represented by the respective speeds of rotation N1 and N2 of the low-pressure 3-22 and high-pressure 3-14 shafts of the turbojet 3) as well as at least one context parameter representing the environment in which the reduction gear 2 is located, here namely the ambient temperature (denoted T12) and the ambient atmospheric pressure (denoted PS0);

a selection module 17B configured to select, among the measurements of parameters obtained by the acquisition module 17A, a set of measurements considered to be stable with regard to a predetermined stability criterion detailed hereafter;

a normalization module 17C configured to normalize the measurements of operating parameters of the set of selected measurements by using measurements of context parameters contained in the set of selected measurements; and an evaluation module 17D configured to evaluate, over the interval of time corresponding to the set of selected measurements, the thermal efficiency of the reduction gear 2 by using a physical model (designated MOD) defining the thermal efficiency based on the difference between the temperature of the lubricating oil at the outlet of the reduction gear 2 and the temperature of the lubricating oil at the inlet of the reduction gear 2.

Modules 17A to 17D are activated for at least one duty cycle of the reduction gear 2, in other words of the turbojet 3. In the example contemplated here, a duty cycle of the reduction gear 2 coincides with a flight of the airplane 4.

The functional modules of the ground-based entity 17 defined by the program PROG also comprise:

a comparison module 17E configured to compare the thermal efficiency evaluated for one or more duty cycles of the reduction gear with respect to at least one reference signature representing an operational behavior or a faulty behavior of the reduction gear 2. In the embodiment described here, the reference signatures are stored in a signature base SIG stored for example in the non-volatile memory 23 of the ground-based entity 17; and a determination module 17F configured to determine a status of the reduction gear 2 depending on the result obtained by the comparison module 17E.

The functions and the operating mode of the modules 17A to 17F, as well as of the modules 19A to 19C of the monitoring system 1 are subsequently described in more detail with reference to the steps of the monitoring method according to the invention.

Figure 6A:
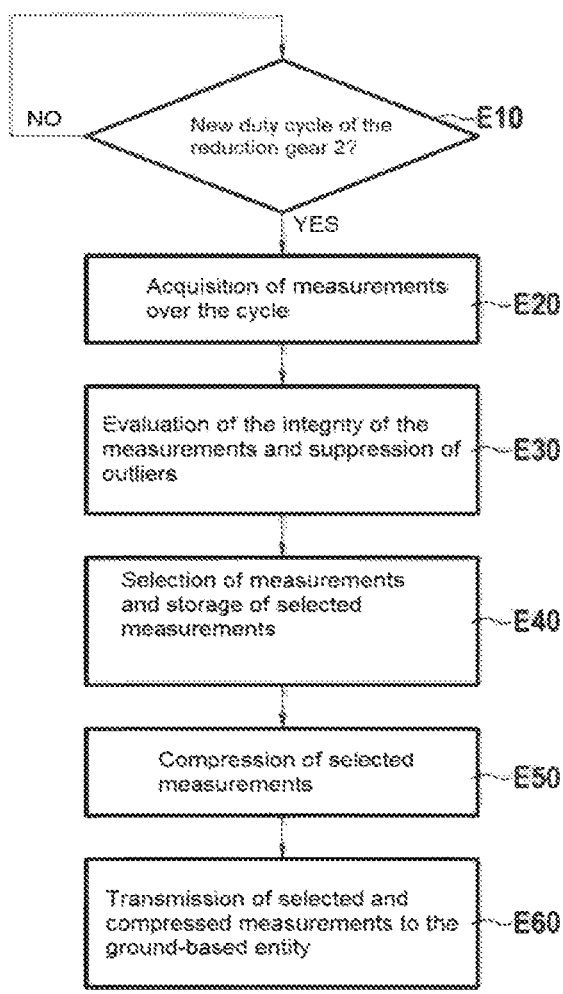
FIG. 6A shows the steps of the monitoring method implemented on board an aircraft equipped with the turbojet of FIG. 2, in one particular embodiment.
Figure 6B:
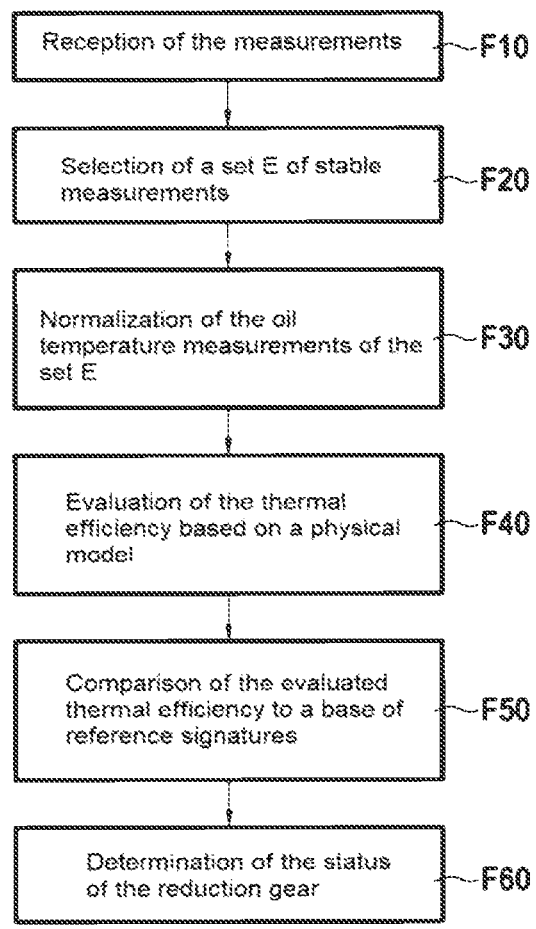
FIG. 6B shows the steps of the monitoring method implemented by the ground-based entity shown in FIG. 5, in one particular embodiment.

FIGS. 6A and 6B represent the main steps of the monitoring method according to the invention as it is implemented by the monitoring system 1 to monitor the status of the reduction gear 2, in one particular embodiment.

In this particular embodiment, the monitoring method comprises a first series of steps (i.e. steps E10 to E60) implemented by the portion 19 of the monitoring system 1 carried on board the airplane 4 (illustrated in FIG. 6A), and a second series of steps (i.e. steps F10 to F60) accomplished by the ground-based entity 17 (illustrated in FIG. 6B). Here it is assumed that the steps shown in FIGS. 6A and 6B are implemented at each new duty cycle of the reduction gear 2, in other words at each new flight of the airplane 4 equipped with the turbojet 3 comprising the reduction gear 2.

With reference to FIG. 6A, during each flight of the airplane 4 (step E10), measurements of different parameters are acquired by means of sensors 18 carried on board the airplane 4. These measurements comprise:

measurements of operating parameters of the turbojet 3, and more particularly here of the rotation speeds N1 and N2 of the shafts of the low-pressure and of the high-pressure compressor of the turbojet 3;

measurements of the operating parameters of the reduction gear 2, and more particularly here of the temperature Toil_in of the lubricating oil of the reduction gear 2 at its inlet, and of the temperature Toil_out of the lubricating oil of the reduction gear 2, measured respectively by the sensors 18A and 18B; and measurements of context parameters, and more particularly here of the ambient temperature T12 and of the ambient atmospheric pressure PS0.

It is noted that other measurements of operating or context parameters can be collected during the flight of the airplane 4 by the sensors 18, such as for example measurements of the pressure of the lubricating oil at the outlet of the reduction gear 2, of the operational severity, etc., these measurements being able to be used in particular by the monitoring system 1 to derive other indicators allowing the status of the reduction gear 2 to be monitored, as further detailed hereafter.

In the embodiment described here, the aforementioned measurements are acquired continuously by the sensors 18 during the flight (with an acquisition frequency depending on the sensor or configurable). They are transmitted by the sensors 18 to the computer 200 for processing by the modules 19A-19C.

Module 19A then verifies the integrity (i.e. the validity) of the temperature measurements carried out by the sensors 18A and 18B which will be used to evaluate the status of the reduction gear 2 (step E30), for the purpose of detecting the presence of outliers.

To this end, it carries out a consistency test of the measurements obtained with respect to theoretical values, defined depending on the speed of the turbojet 3 (given by the measurements of the speeds of rotation N1 and N2 also acquired by the sensors 18). These theoretical values are known to the designer of the turbojet 3, and correspond to the limit values in terms of pressure, of oil temperatures, of rotation speeds, etc. of the turbojet 3. Measurements that are inconsistent with respect to these theoretical values are considered outliers and are eliminated (suppressed) by the filtering module 19A.

The filtering module 19A can verify other conditions for detecting whether the temperature measurements returned by the sensors 18A and 18B are valid. Thus, in the embodiment described here, it also verifies:

whether the temperature Toil_in is located in a range of values having a predetermined deviation from the ambient temperature: an outlier is detected if the value of the temperature Toil_in at the inlet of the reduction gear 2 has a deviation greater than a predetermined threshold with respect to the corresponding (i.e. acquired at the same instant) measurement of the ambient temperature T12. The threshold considered is for example taken to be equal to 30° C.; and/or if the temperature Toil_out is located in a range of values having a predetermined deviation from a reference temperature, determined experimentally. A reference temperature of this type corresponds for example to the operating temperature of the lubricating oil of the reduction gear 2 (for example 120° C.). An outlier is detected for a temperature Toil_out at the outlet of the reduction gear when this value has a deviation greater than a predetermined threshold with respect to a reference temperature (for example 5° C. for a reference temperature of 120° C.); and/or if the temperature Toil_out is greater than the temperature Toil_in: an outlier is detected for the temperature Toil_out at the outlet of the reduction gear when this value is less than the value of the temperature Toil_in at the inlet of the reduction gear.

In addition, the filtering module 19A can also ensure that upon starting the turbojet 3, the temperatures Toil_out and Toil_in have similar or identical values.

Following filtering of the outliers, the selection module 19B selects the measurements acquired by the sensors 18 (and filtered if necessary by the filtering module 19A), corresponding to at least one operating phase of the turbojet 3 (which corresponds here to at least one flight phase of the airplane 4). Different flight phases can be considered depending on the monitoring that is contemplated and the specific phenomena or degradations which it is desired to detect (seizing of the reduction gear, maximum efficiency, status of the reduction gear, etc.): ground idle, takeoff, climb, cruise, descent or engine shutdown. These phases can be detected, for example, based on measurements of the speeds of rotation N1 and N2 of the low-pressure and high-pressure shafts of the turbojet 3, in a manner known per se. The operating phases corresponding to stability of the airplane 4 (during which the airplane 4 does not move too much) are preferred.

In the embodiment described here, the selection module 19B selects the measurements acquired by the sensors 18 corresponding to one or more predetermined operating phases during one or more time intervals, also designated by "snapshots" (step E40). These time intervals can have a predetermined duration denoted T, identical for all the operating phases of the turbojet 3, or as a variant start and have a duration which depends on the operating phase considered. By way of examples:

for a ground idle phase, the selection module 19B can consider, during the selection of the measurements, one or preferably more consecutive or successive time intervals with a duration of 5 minutes each starting from the moment where the module 19B detects that the turbojet 3 is on the ground at an idle speed;

for a takeoff phase, for which greater thermal deviations are expected to be seen, the selection module 19B can preferably consider a single time interval starting when it detects that the throttle lever of the airplane 4 is located beyond the taxi position, and continuing until a peak of the exhaust gas temperature (EGT) is detected for 15 seconds;

for a climb phase of the airplane (which corresponds to a non-horizontal position of the airplane), the selection module 19B can consider one or more consecutive or successive time intervals with a duration of 5 minutes each, starting from the moment when the selection module 19B detects that the throttle lever of the airplane 4 is located in a climb position;

for a cruise phase of the airplane, the selection module 19B can consider one or preferably more consecutive or successive time intervals with a duration of 5 minutes each starting at the moment where the selection module 19B detects a stabilized speed or altitude of the airplane 4;

for a descent phase of the airplane, the selection module 19B can consider one or more consecutive or successive time intervals of a duration of 5 minutes each starting with the moment where the selection module 19B detects a speed of the airplane 4 stabilized to an approach speed, or continuing until the detection of a wheel of the airplane 4 touching the ground;

for a shutdown phase of the airplane, the selection module 19B can preferably consider a single time interval beginning when it detects a rotation stop command of the turbojet 3, and lasting 5 minutes or until the detection of the stopping of rotation of the reduction gear 2 of the turbojet 3.

Of course, these examples are given only by way of illustration.

The measurements selected by the selection module 19B are then stored by it locally, in the form of a data file for example, in a non-volatile memory of the computer 200 (the frequency of the measurements stored is equal to their frequency of acquisition, leaving out the outliers suppressed during step E30).

It is noted that, in one variant embodiment, the sensors 18 can be controlled to acquire measurements of the operating and context parameters only in the selected operating phases and during the time intervals determined for these operating phases.

In the embodiment described here, the measurements selected by the selection module 19B are then compressed by the transmission module 19C of the portion carried on board 19 by means of a compression algorithm with no loss of information (step E50). The transmission module 19C compresses, during this step for example, the data file stored in the non-volatile memory of the computer 200 and containing the selected measurements, into a zip file, in order to limit the volume of data to be transmitted to the ground-based entity 17.

Then the (filtered) measurements, selected and compressed, are transmitted by the transmission module 19C located on board the airplane 4 to the ground-based entity 17 for processing and for the monitoring of the reduction gear (step E60). This transmission is carried out via the wireless communication interface mentioned previously, which can in particular be a satellite communication interface. This transmission can be implemented upon detection of a particular event, such as for example an operational event of the airplane such as the end of the flight, or depending on the life situation of the turbojet 3 or upon detection of a situation requiring a maintenance intervention on the turbojet 3.

With reference to FIG. 6B, the selected and compressed measurements are received (i.e. obtained) by the ground-based entity 17 and more particularly by its acquisition module 17A, via its communication means 24 and its satellite communication interface (step F10). It is assumed here that the measurements received correspond to several snapshots (time intervals), each with a duration T.

The modules 17B and 17C of the ground-based entity 17 then implement processing intending to suppress the effects linked to the context of acquisition of the measurements received: the purpose is, on the one hand, to suppress the effect linked strictly speaking to the operating phases of the turbojet 3 (flight phases) considered and, on the other hand, the effect linked to variations of the context parameters (ambient temperature, atmospheric pressure, etc.) during the operating phases, in other words to the environment of the turbojet 3 and especially of the reduction gear 2. To this end, the modules 17B and 17C proceed in the following fashion.

The measurements received are divided by the selection module 17B into a plurality of sets of measurements (denoted E1, E2, . . . Ek, . . . k designating an integer greater than or equal to 1) corresponding respectively to the different acquired snapshots of duration T in which the sensors 18 acquired the measurements.

The operating parameters, such as the rotation speeds N1 and N2 of the low-pressure and high-pressure shafts of the turbojet 3, and the oil temperatures Toil_in and Toil_out of the lubricating oil of the reduction gear 2, as well as the context parameters such as the ambient temperature or pressure, being likely to vary depending on the flight phases considered, the selection module 17B of the ground-based entity 17 selects, in conformity with the invention, among the sets of measurements of duration T, E1, E2, . . . Ek, . . . that corresponding to the measurements of the most stable parameters with respect to a determined criterion (step F20).

It is noted that if only one single set of measurements is available (i.e. is single snapshot was considered for the operating phase considered), this set of measurements is automatically selected (implicit stability criterion). It is assumed here, by way of illustration, that several snapshots were considered during the acquisition of the measurements and that several sub-sets E1, E2, . . . , Ek, . . . are available to the selection module 17B.

In the embodiment described here, the module 17B selects the set of measurements of operating parameters which maximizes a criterion composed of a first functional stability criterion and a second criterion of dispersion of the parameter measurements with respect to expected theoretical values supplied by a theoretical mode.

As a variant, other parameters which can vary depending on the flight phases where the measurements are acquired can be considered during the selection of the set of measurements, such as for example the attitude of the airplane 4, the lubricating oil level in the oil circuit reservoir 10, the pressure of the lubricating oil at the outlet of the reduction gear 2, the operational severity, etc.

The functional stability criterion is estimated for each set Ek of measurements corresponding to a time interval of duration T by evaluating a first stability score denoted e1 defined by:

$$\theta 1(k) = \frac{\sum_{i \in \Omega 1} \alpha 1_i C_i(k)}{\sum_{i \in \Omega 1} \alpha 1_i}$$

where the set $\Omega 1$ designates a set containing the operating parameters N1, N2, Toil_in and Toil_out and the context parameters T12 and PS0, $\alpha 1_i$ with $i \in \Omega 1$ designating real weighting factors greater than or equal to 0, and:

$$C_i(k) = \frac{\text{Card}\left(U_{j \in \frac{\delta k}{i(j)} < imax \text{ and } i(j) > imin} i(j)\right)}{\text{Card}(U_{j \in Ek} i(j))}$$

where i(j) designates the jth measurement of the parameter indexed by the index i comprised in the set Ek. $C_i(k)$ therefore designates the proportion of the measurements of the parameter i in the set Ek which has values comprised in a range of predefined values [imin; imax] for the parameter i. The values imax and imin can be determined by experience or are known to the designer of the turbojet 3. The weighting factors $\alpha 1_i$ for $i \in \Omega 1$ can be defined by experts or by study. In a particular embodiment, they can all be considered equal.

The dispersion criterion is estimated for each set Ek of measurements by evaluating a second stability score denoted $\theta 2$ defined by:

$$\theta 2(k) = \frac{\sum_{i \in \Omega 2} \alpha 2_i \sigma_i(k)}{\sum_{i \in \Omega 2} \alpha 2_i}$$

where the set $\Omega 2$ designates a set comprising, on the one hand, the operating parameters N1, N2, Toil_in and Toil_out and the context parameters T12 and PS0, and on the other hand here, other parameters such as the number of hours of operation (i.e. of rotation) of the reduction gear 2, the number of duty cycles (i.e. of rotation) of the reduction gear 2, etc. $\alpha 2_i$, with $i \in \Omega 2$, designates real weighting factors greater than or equal to 0, and:

$$\sigma_i(k) = \frac{\text{Card}\left(U_{j \in Ek/\sqrt{(i(j)-\bar{i})^2} < \sigma max} i(j)\right)}{\text{Card}\left(U_{j \in Ek} i(j)\right)}$$

where $\bar{i}$ and $\sigma max$ designate respectively the average and the maximum dispersion (determined empirically) of the measurements of the operating parameter i on the flight phase considered and the snapshot considered. $\sigma_i(k)$ therefor designates the proportion of the measurements of each operating parameter in the set Ek considered having a determined theoretical dispersion. The weighting factors $\alpha 2_i$ for $i \in \Omega 2$ can be defined by experts or by study. In one particular embodiment, they can all be taken as equal.

The selection module 17B then selects the set E among the sets Ek maximizing a weighted sum of the first stability score $\theta 1$ and of the second stability score $\theta 2$, or:

$$E = \max_{Ek, k>1}(\beta 1 \theta 1 + \beta 2 \theta 2)$$

where $\beta 1$ and $\beta 2$ are real weighting factors and positive or zero, set by expertise or by study, and allowing emphasizing one and/or the other of the stability scores for selecting the set E.

Once the set E is selected, the normalization module 17C proceeds with a normalization of the measurements of the oil temperatures contained in the set E (step F30).

This normalization has as its goal in particular to make the indicators derived on each flight and intended to allow the monitoring of the reduction gear 2 mutually comparable, and particularly the thermal efficiency of the reduction gear 2.

In fact, in conformity with the invention, the thermal efficiency of the reduction gear 2 is evaluated based on a physical model defining the thermal efficiency based on the difference between the temperature Toil_out of the lubricating oil at the outlet of the reduction gear and the temperature Toil_in of the lubricating oil at the inlet of the reduction gear. This gradient of temperatures as well as the conditions in which the lubricating oil is found are variable during a flight and from one flight to another: they depend in particular on the rotation speed of the turbojet 3 and on the parameters of the context in which the turbojet 3 is located (ambient temperature and atmospheric pressure in particular) when the measurements of the oil temperatures were acquired. The normalization carried out therefore seeks to correct the influence of these factors (in other words of the environment and the acquisition conditions) on the oil temperatures (and other operating parameters of the reduction gear 2) considered to evaluate the thermal efficiency. It is carried out by using the measurements of the context parameters presented in the set E and a model representing the oil temperature measurements as a function of these context parameters, a model of this type being able to be obtained experimentally or theoretically. This normalization is accomplished for example as written in the document of J. Lacaille et al. entitled "Online Normalization Algorithm for Engine Turbofan Monitoring," *Annual Conference of the Prognostics and Health Management Society*, 2014.

Moreover, as mentioned above, the evaluation of the thermal efficiency of the reduction gear 2 is accomplished, in conformity with the invention, by means of a physical model defining the thermal efficiency based on the gradient of the oil temperatures at the reduction gear 2 resulting from Fick's second law.

More particularly, to establish this model, the inventors have made the simplifying assumption that the thermal dissipation at the reduction gear 2 is solely due to the heating of the lubricating oil. This assumption is permissible due in particular to the steps of normalization which have just been described, and which allow the thermal heating linked to radiation of the metallic parts of the reduction gear 2 and to the conduction between these metallic parts to be assumed constant, and to only take into account, during monitoring of the thermal efficiency of the reduction gear 2, the energy dissipation in the lubricating oil.

The energy dissipated in the lubricating oil per unit time, denoted W(t), can be expressed as a function of the lubricating oil volume VOL(t) having transited through the reduction gear 2, of the thermal conductivity v(T) of the lubricating oil (which depends on the temperature T and is known to the lubricating oil supplier) and of the temperature gradient $\Delta$Toil, or:

$$W(t) = \text{VOL}(t) \cdot v(T) \cdot \Delta Toil \qquad \text{(Eq. 1)}$$

or, taking into account the relation between the oil volume VOL(t) and the oil flow rate $D_{oil}(t)$ transiting through the reduction gear 2 and given by:

$$D_{oil}(t) = q \cdot \text{VOL}(t) \cdot S \qquad \text{(Eq. 2)}$$

Where S designates the contact surface area of the lubricating oil at the reduction gear 2 (in the example of the gearbox considered here, this is the contact surface area of the oil in the gear teeth, defined by the design of the gearbox) and q the mass per unit volume of the lubricating oil, in the following form:

$$W(t) = \frac{D_{oil}(t)}{qS} \cdot v(T) \cdot \Delta Toil \qquad \text{(Eq. 3)}$$

The lubricating oil volume VOL(t) having transited by the reduction gear 2, or equivalently the flow rate of oil $D_{oil}(t)$ transiting by the reduction gear 2, is supplied by the main pump 11; it depends on the speed at which the main pump 11 is driven, in other words in the example contemplated here, on the rotation speed N2 of the shaft of the high-pressure compressor of the turbojet 3. The oil volume VOL(t) or equivalently the flow rate of oil $D_{oil}(t)$ can easily be modeled as a function of the rotation speed N2, in a manner known to a person skilled in the art, by means of an empirical law for example.

This empirical law is generally established by the suppliers of the pump by considering the plurality of pumps. It can happen that certain deviations are noted for certain pumps, which can lead to inaccuracies. To avoid inaccuracies of this type, in the embodiment described here, the ground-based entity 17 (via for example its evaluation module 17D) can proceed with a recalculation of this empirical law to customize it and to make it more representative of the operation of the main pump 11 equipping the turbojet 3.

Likewise, various recalculations (or normalizations) allowing taking into account the ambient conditions corresponding to the snapshot considered can be implemented. A recalculation of this type can prove relevant for example to the thermal conductivity of the lubricating oil: in fact, as previously mentioned, this is known to the lubricating oil supplier for a given operating temperature, which does not necessarily correspond to the operating temperatures noted in the snapshot. Yet the thermal conductivity of the lubricating oil depends on the temperature. A recalculation of the value supplied by the lubricating oil supplier as a function of the ambient temperature observed on the snapshot considered can therefore be implemented (by means of a duly determined coefficient).

As a variant, a recalculation of the oil flow rate can also be contemplated to take into account a variation of the lubricating oil pressure with respect to a reference pressure (taken equal to the atmospheric pressure for example). In fact, by means of the Pitot formula, it is possible to establish a proportionality link between a differential of the oil flow rate and the square root of a pressure differential, allowing recalculating the flow rate as a function of the pressure.

It is noted that these recalculations are optional.

The evaluation module 17D of the ground-based entity 17 evaluates the thermal efficiency denoted p of the reduction gear 2 by using equations (Eq. 1) or (Eq. 3) given above (step F40). More particularly, the thermal efficiency of the reduction gear 2 can be written in the following form (designated by the model (MOD)):

$$\rho = \frac{WN1(t)dt - W(t)}{WN1(t)dt}$$

where WN1(t) designates the energy transmitted by the low-pressure compressor to the fan of the turbojet 3, and W(t) designates the energy dissipated in the lubricating oil per unit time (given by equation (Eq. 1) or equation (Eq. 3)), in other words the efficiency losses linked to the quantity of oil which passes into the lubricating oil at the contact surface area S. It is noted that the energy WN1(t) depends on the rotation speed N1 of the low-pressure compressor shaft and can be calculated according to the following relation:

$$WN1(t) = \frac{1}{2} \cdot (\omega 1)^2 \cdot \iiint R^2 dM$$

where ω1 designates the angular speed of the low-pressure compressor shaft of the turbojet 3 (which for its part is linked to the rotation speed N1) and $\iiint R^2 \, dM$ designates the moment of inertia of the low-pressure compressor shaft of the turbojet 3 (fixed during the lifetime of the turbojet 3 except in the event of breakage of a blade).

The thermal efficiency of the reduction gear 2 is evaluated by the evaluation module 17D at different points of the flight of the airplane 4 by using different oil temperature measurements comprised in the set E, i.e. at each measured instant corresponding to the time interval of the set E.

Then, in conformity with the invention, the thermal efficiency thus evaluated is compared by the comparison module 17E of the ground-based entity 17 to a reference signature base SIG representing an operational behavior or a faulty behavior of the reduction gear 2 (step F50). What is meant here by signature is the description of a behavior of the thermal efficiency representing its operational or on the contrary faulty status. Each reference signature can be associated with the base SIG at a corresponding status of the reduction gear 2. Each reference signature can be associated in the base SIG with a corresponding status of the reduction gear 2. The reference signature base SIG is stored here, as previously mentioned, in the memory 23 of the ground-based entity 17.

In the embodiment described here, the reference signature base SIG contains the following signatures allowing a fault of the reduction gear 2 to be suspected:

reduction of the thermal efficiency at a more or less high speed (which can be specified in the signature base):
  (i) a rapid decrease in efficiency can be observed, for example, when there exists a fouling of the teeth and/or of the hub of the reduction gearing and/or a pollution of the lubricating oil;
  (ii) a slower decrease in efficiency can be observed during a degradation process of the reduction gear during which the teeth of the gears end up degrading;

increase of efficiency: the metallic conduction of the reduction gear 2 can increase following a mechanical degradation of its gears. In this case, an increase in the measured efficiency in the oil can be observed, because the thermal dissipation in the lubrication oil will be reduced;

efficiency outside a predetermined range of values (typically above a predetermined threshold, denoted THR1 here): this range can be set by experience, or be determined via a numerical model established as a function for example of the different operating phases of the turbojet 3 and the technical characteristics of the reduction gear 2, or even be built up by study (considering for example that the first duty cycles of the reduction gear 2 gives a reference frame of the values considered to be representative of an operational and healthy function of the reduction gear 2).

The comparison of the thermal efficiency evaluated over the duration T to the reference signatures of the base SIG allows the determination module 17F to determine a current status of the reduction gear 2 (step F60).

Figure 7:
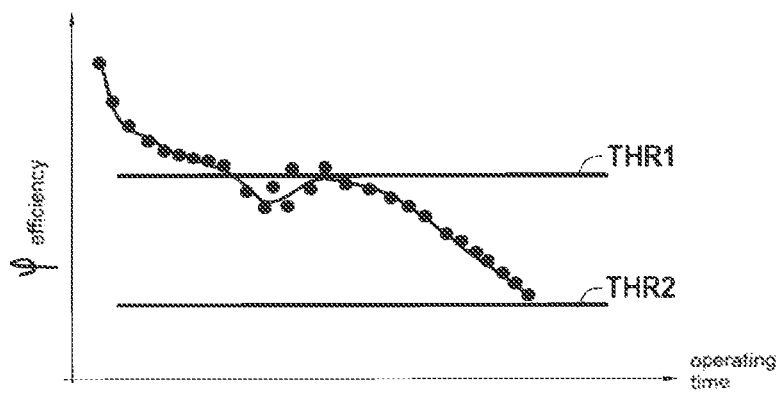
FIG. 7 shows an example of the monitoring of the thermal efficiency of the reduction gear of FIG. 3.

Thus, by way of an example, the determination module 17F determines that the reduction gear 2 is in an operational status if the thermal efficiency of the reduction gear 2 remains in the predetermined range of values mentioned above (and more particularly above the threshold THR1) and defined within the reference signature base SIG. If the efficiency is outside the predetermined range of values defined in the base SIG, but beyond an acceptable operating threshold denoted THR2 (also defined in the base SIG), a status of "to be monitored" can be determined by the module 17F. Below this threshold, the module 17F can determine a "faulty" status of the reduction gear 2 and recommend a replacement of the reduction gear 2. It is noted that other thresholds can be defined, corresponding to other status of the reduction gear and in particular to different degrees of monitoring. FIG. 7 shows an evolution of the thermal efficiency as a function of operating time of the reduction gear 2, on which are shown the thresholds THR1 and THR2.

In addition, the status of the reduction gear 2 can be determined by the module 17F by analyzing the values of the thermal efficiency obtained for the selected set E on one flight of the airplane 4, or by also taking into account the evolution of this efficiency over several flights of the airplane 4 (trending study) by relying on the signature base SIG.

It is also appropriate to note that the reference signatures can also consist of curves established by prediction of the evolution of the efficiency.

Moreover, the module 17F can, for determining the status of the reduction gear 2, rely on other indicators in addition to the analysis of the thermal efficiency of the reduction gear 2. The evaluation of these indicators can require the acquisition of additional measurements by the sensors 18 (and normalization of these measurements if necessary).

Thus, the module 17F can in particular also take into account health indicators of the reduction gear 2, and correlate these indicators with the analysis of the evolution of the thermal efficiency. Health indicators of this type are for example:

- a heating margin indicator of the temperature of the lubricating oil between the inlet and the outlet of the reduction gear 2: this indicator corresponds to the difference between the maximum thermal dissipation possible within the turbojet 3 (defined by design) and the maximum thermal dissipation within the reduction gear 2 (encountered during the takeoff phase of the airplane 4) calculated based on normalized temperatures of the lubricating oil at the inlet and at the outlet of the reduction gear 2;
- a margin indicator of the temperature of the lubricating oil at the outlet of the reduction gear 2 during the takeoff phase of the airplane 4: this indicator corresponds to the difference between the maximum possible value for the lubricating oil and the maximum possible value of the temperature of the lubricating oil at the outlet of the reduction gear 2, taking into account the difference between the ambient temperature corresponding to the hottest operating point and to the hottest day and the ambient temperature (T12) corresponding to the maximum value of the temperature of the lubricating oil at the outlet of the reduction gear 2 (in other words, at which this difference was deduced). It is noted that the more aged the turbojet 3 and the reduction gear 2 become, the smaller the deviation between the two differences;
- a temperature operating margin indicator of the reduction gear under worst case conditions: for this indicator, the reference is no longer the maximum temperature of the lubricating oil, but rather that expected by the reduction gear. This indicator takes into account the ratio between the maximum attained rotation speed N1 compared to the theoretical maximum value of this rotation speed;
- a pressure margin indicator of the lubricating oil during a predetermined phase of operation (for example during takeoff and during idle) of the turbojet 3: this indicator is intended to allow the evaluating how the oil pressure evolves with respect to a reference which is linked to the minimum pressure of the main pump 11. The oil pressure at the inlet of the reduction gear 2 must be greater than a threshold to offer a sufficient oil flow rate. This indicator corresponds to the difference between the pressure value which is measured (projected to a maximum rotation speed of the main pump 11, this speed being defined here by the maximum rotation speed N2 of the high-pressure compressor shaft) and the minimum pressure value; and
- a margin indicator of the thermal efficiency of the reduction gear corresponding to the difference between the thermal efficiency of the reduction gear evaluated in conformity with the invention and the minimum expected (theoretical) value of this thermal efficiency (known by design). It is noted that when the thermal efficiency of the reduction gear is degraded, the oil will be heated less quickly than expected.

These indicators are calculated based on measurements of the selected (and normalized) sets E, and can be considered during the step of determining the status of the reduction gear for evaluating the status of the reduction gear.

In particular, these health indicators can be compared, like the thermal efficiency, to reference signatures allowing obtaining additional information on the status of the reduction gear 2, and to invalidate or confirm the established diagnosis by analyzing the thermal efficiency of the reduction gear 2. These reference signatures, established for the health indicators, can also be stored in the signature base SIG or in another base.

Thus for example, these reference signatures can comprise the following signatures underpinning the detection (or the suspecting) of a faulty status of the reduction gear 2:

- a heating margin indicators of the temperature of the lubricating oil between the inlet and the outlet of the reduction gear outside a predetermined range of values (determined by experience, by modeling or by study as described previously for the predetermined range of values applicable to the thermal efficiency);
- a margin indicator of the temperature of the lubricating oil at the outlet of the reduction gear outside a predetermined range of values (determined by experience while taking into account the physical properties of the lubricating oil to avoid coking and solidification of the oil);
- a pressure margin indicator of the lubricating oil outside a predetermined range of values (determined by experience, by modeling or by study as described previously for the predetermined range of values applicable to the thermal efficiency).

In another embodiment, the determination module 17F can also take into account trending indicators for interpreting the deviations possibly observed in the thermal efficiency and to isolate rapid deviations. Trending indicators of this type characterized the use of the reduction gear 2 and comprise for example:

- an indicator representing a number of duty cycles of the reduction gear 2 and/or a number of duty cycles of the reduction gear 2 since a maintenance operation carried out on the reduction gear. The number of duty cycles is defined here by the number of takeoffs of the airplane 4 equipped with the turbojet 3;
- an indicator representing an operating time of the reduction gear 2 and/or an operating time of the reduction gear 2 since a maintenance operation carried out on the reduction gear. The operating time of the reduction gear 2 is defined here as the time when the reduction gear 2 has been in operation; this time corresponds for example to the duration during which the turbojet 3 is supplied with fuel and the rotation speed of the fan is not zero;
- an indicator representing a number of duty cycles of the reduction gear 2 since a maintenance operation carried out on the turbojet 3 (allows monitoring the frequency of the maintenance operations and to indicate, if necessary, a deficiency in one of these operations);
- an indicator representing an operating time of the reduction gear 2 at a high temperature;
- an indicator representing an operating time of the reduction gear 2 with a high particle level in the lubricating oil of the reduction gear 2.

Of course, these examples are given only by way of illustration.

These indicators can be used by the determination module 17F to establish an indicator of fatigue of the reduction gear 2. This fatigue indicator is defined by a probability of malfunction of the reduction gear 2 determined as a function of an "overall" operating time t_use of the reduction gear 2 evaluated based on the following weighted sum:

$$t\_use = t0 + \gamma 1 t1 + \gamma 2 t2 + \gamma 3 t3$$

Where:
- t0 represents the weighted sum of the durations of all the duty cycles of the reduction gear 2, in other words here the duration of all the flights of the airplane 4 in which the reduction gear 2 has participated. Each duty cycle (i.e. flight of the airplane 4 here) is associated with a weighting factor characterizing the severity of the duration of the duty cycle (i.e. of the flight) on the fatigue of the reduction gear 2. By way of illustration, the minimum, maximum and mean values of this weighting factor can be selected respectively equal to:
  - (i) [0.75; 1.25; 1] if $-0.5 <$ (dref–dcycle)/dref $< 0.5$ where dcycle designates the duration of the duty cycle considered, and dref a reference duration determined experimentally;
  - (ii) [0.5; 1; 0.75] if (dref–dcycle)/dref $\leq -0.5$; and
  - (iii) [1; 1.5; 1.15] if $0.5 \leq$ dref–dcycle)/dref,
- t1 designates the operating duration of the reduction gear 2 at a reduced pressure or flow rate (i.e. at a pressure, respectively a flow rate, less than a threshold corresponding to the pressure, respectively the flow rate expected by design at 50% of the rotation speed of the main pump 11 (i.e. in the reduction gear example contemplated here, of the rotation speed N2 of the high-pressure compressor shaft), in other words corresponding to a negative or zero pressure margin;
- t2 designates the operating duration of the reduction gear 2 at an excessive pressure or flow rate (i.e. at a pressure, respectively a flow rate, greater than a corresponding threshold corresponding to the pressure, respectively to the flow rate, expected by design at 100% of the rotation speed of the main pump 11 (i.e. in the reduction gear example contemplated here, of the rotation speed N2 of the high-pressure compressor shaft);
- t3 designates the operating duration of the reduction gear 2 at high temperature (i.e. at a temperature higher than that expected for the lubricating oil, in still other words corresponding to a negative temperature margin);

The weighting factors $\gamma 1, \gamma 2, \gamma 3$ can be considered empirically, just like the law of probability giving the probability of malfunction of the reduction gear 2 as a function of duty cycle t_use.

The different aforementioned indicators (health, trending and fatigue) can be used for example to determine whether an inspection or a disassembly of the reduction gear 2 is necessary, when at least one of them has values which are not consistent with normal operation of the reduction gear 2.

It is noted that the different aforementioned indicators, as well as the evolution of the thermal efficiency, can be shown graphically to facilitate their interpretation.

The invention, via the monitoring of the thermal efficiency of the reduction gear 2, combined if necessary with indicators, allows accurate monitoring of the status of the reduction gear 2 and rapid detection of a fault in it (even anticipation of this fault) allowing effective intervention.

The invention claimed is:

1. A method for monitoring a status of a reduction gear of a gas turbine comprising, for at least one duty cycle of the reduction gear:
   a step of obtaining at least one set of measurements of a plurality of parameters accomplished over at least one time interval of a determined duration during at least one operating phase of the gas turbine, said parameters being measured by sensors carried in the gas turbine and comprising operating parameters of the reduction gear including temperatures of a lubricating oil of the reduction gear at an inlet and at an outlet of the reduction gear, and operating parameters of the gas turbine including at least one parameter representing a speed of the gas turbine, and at least one context parameter representing an environment wherein said reduction gear is located;
   a step of selecting, among said at least one set of measurements obtained for said at least one operating phase, of a set containing measurements that are stable with regard to a predetermined stability criterion;
   a step of normalizing temperatures of the lubricating oil at the inlet and at the outlet of the reduction gear of the set of selected measurements by using the measurements of the context parameters of the set of selected measurements;
   a step of evaluating, based on the set of selected measurements wherein said temperatures of the lubricating oil have been normalized, a thermal efficiency of the reduction gear by using a physical model defining the thermal efficiency based on a difference between the temperature of the lubricating oil at the outlet of the reduction gear and the temperature of the lubricating oil at the inlet of the reduction gear;
   a step of comparing the thermal efficiency evaluated for said at least one duty cycle of the reduction gear with respect to at least one reference signature representing an operational behavior or a faulty behavior of the reduction gear;
   a step of determining a status of the reduction gear depending on the result of the comparison step; and
   a step of replacing the reduction gear based on the status of the reduction gear.

2. The monitoring method according to claim 1, wherein the context parameters comprises a temperature and/or an ambient atmospheric pressure.

3. The monitoring method according to claim 1, wherein the operating parameters of the reduction gear also comprise a pressure of the lubricating oil of the reduction gear.

4. The monitoring method according to claim 1, wherein the step of selecting the set of measurements comprises a step of evaluating, for several sets of measurements corresponding to a time interval with said determined duration:
   of a first score called stability equal to a weighted sum, evaluated over the operating parameters, of the proportion of the measurements of each operating parameter in the set in question located in a predefined range of values for this operating parameter;
   of a second stability score, equal to a weighted sum evaluated over the operating parameters, of the proportion of the measurements of each operating parameter in the set in question having a determined theoretical dispersion for this operating parameter;

said set of measurements selected during the selection step corresponding to the set of measurements maximizing a weighted sum of the first stability score and of the second stability score.

5. The monitoring method according to claim 1, also comprising a step of evaluating at least one health indicator of the reduction gear among at least:
- a heating margin indicator of the temperature of the lubricating oil between the inlet and the outlet of the reduction gear;
- a margin indicator of the temperature of the lubricating oil at the outlet of the reduction gear;
- an operating temperature margin indicator of the reduction gear under worst case conditions;
- a pressure margin indicator of the lubricating oil during a predetermined operating phase of the gas turbine; and
- a thermal efficiency margin indicator of the reduction gear;

and wherein the step of determining the status of the reduction gear also takes into account said at least one evaluated health indicator.

6. The monitoring method according to claim 1, comprising a step of evaluating at least one trending indicator characterizing one use of the reduction gear among at least:
- an indicator representing a number of duty cycles of the reduction gear and/or a number of duty cycles of the reduction gear since a maintenance operation carried out on the reduction gear;
- an indicator representing an operating time of the reduction gear and/or an operating time of the reduction gear since a maintenance operation carried out on the reduction gear;
- an indicator representing a number of duty cycles of the reduction gear since a maintenance operation carried out on the gas turbine;
- an indicator representing an operating time of the reduction gear at high temperature;
- an indicator representing an operating time of the reduction gear with a high particle level in the lubricating oil of the reduction gear; and wherein the step of determining the status of the reduction gear also takes into account said at least one evaluated trending indicator.

7. The monitoring method according to claim 1, comprising:
- a step of detecting whether the measurements obtained of the temperature at the inlet and of the temperature at the outlet of the reduction gear comprise outliers; and
- a step of eliminating said outliers;

wherein:
- an outlier is detected for a said temperature when it is inconsistent with a theoretical value determined for this temperature depending on the speed of the gas turbine; and/or
- an outlier is detected for the temperature at the inlet of the reduction gear when this value has a deviation greater than a predetermined threshold with respect to a measurement of the ambient temperature; and/or
- an outlier is detected for the temperature at the outlet of the reduction gear when this value has a deviation greater than a predetermined threshold with respect to a reference temperature; and/or
- an outlier is detected for the temperature at the outlet of the reduction gear when this value is less than the value of the temperature at the inlet of the reduction gear.

* * * * *